(12) United States Patent
Turner et al.

(10) Patent No.: US 6,331,578 B1
(45) Date of Patent: Dec. 18, 2001

(54) PROCESS FOR PREPARING INTERPENETRATING POLYMER NETWORKS OF CONTROLLED MORPHOLOGY

(76) Inventors: Josephine Turner, 4725 Lloydtown Rd., Keltleby, Ontario (CA), L0G 1J0; Yu-Ling Cheng, 1379 Glenburine Road, Mississauga, Ontario (CA), L5G 3C7

( * ) Notice: Subject to any disclaimer, the term of this patent is extended or adjusted under 35 U.S.C. 154(b) by 0 days.

(21) Appl. No.: 09/442,830

(22) Filed: Nov. 17, 1999

Related U.S. Application Data
(60) Provisional application No. 60/108,982, filed on Nov. 18, 1998.

(51) Int. Cl.$^7$ .................................................. C08J 7/16
(52) U.S. Cl. ........................... 523/105; 524/858; 524/849; 525/100; 525/106; 525/479; 525/903; 523/106
(58) Field of Search .................................... 524/858, 849; 525/100, 106, 479, 903; 523/105, 106

(56) References Cited

U.S. PATENT DOCUMENTS

| | | |
|---|---|---|
| 3,485,802 | * 12/1969 | Witsiepe . |
| 4,302,553 | * 11/1981 | Frisch et al. . |
| 4,423,099 | 12/1983 | Mueller et al. . |
| 4,752,624 | 6/1988 | Kim et al. . |
| 4,931,287 | 6/1990 | Bae et al. . |
| 5,135,516 | * 8/1992 | Sahatjian . |
| 5,158,721 | * 10/1992 | Allegrezza et al. . |
| 5,183,859 | 2/1993 | Sasaki et al. . |
| 5,424,375 | 6/1995 | He et al. . |
| 5,580,929 | 12/1996 | Tanaka et al. . |
| 5,786,425 | * 7/1998 | Murphy et al. . |
| 5,789,461 | * 8/1998 | Nicolson et al. . |
| 5,789,483 | * 8/1998 | Ingenito et al. . |
| 6,011,082 | * 1/2000 | Wang et al. . |

FOREIGN PATENT DOCUMENTS 25 18 904 * 11/1975 (DE) .

OTHER PUBLICATIONS

Aoki, T. et al. (1994). "Temperature–Responsive Interpenetrating Polymer Networks Constructed with Poly(acrylic acid) and Poly(N,N–dimethylacrylamide)" *Macromolecules* 27(4):947–952.
Gudeman, L.F. et al. (1995). "Preparation and Characterization of pH–Sensitive, Interpenetrating Polymer Networks of Poly(vinyl alcohol) and Poly(acrylic acid)" *Journal of Applied Polymer Science* 55:919–928.
Kataoka, K. et al. (1995). "Controlled Adsorption of Cells on Microdomail Structured Polymer Surfaces" *Polym. Mater. Sci. Eng.* 53:37–41.
Lee, Y.M. et al. (1996). "Synthesis and Swelling Characteristics of pH and Thermo–responsive Interpenetrating Polymer Network Hydrogel Composed of Poly(vinyl alcohol) and Poly(acrylic acid)" *Journal of Applied Polymer Science* 62:301–311.

Lipatov, Y.S. et al. (1999)."The interrelation between the kinetics of the IPN formation at the interface with solid and surface segregation." *Polymer* 40:6485–6492.
Murayama, S. et al. (1993). "Hydrophobic and hydrophilic interpenetrating polymer networks (IPNs) composed of polystyrene and poly(2–hydroxyethyl methacrylate): 2. Gradient composition in the IPNs synthesized by photopolymerization" *Polymer* 34(18):3893–3898.
Murayama, S. et al. (1993). "Hydrophobic and hydrophilic interpenetrating polymer networks composed of polystyrene and poly(2–hydroxyethyl methacrylate): 1. PS–Phema sequential IPNs synthesized in the presence of a common solvent" *Polymer* 34(13):2845–2852.
Nishi, S. et al. (1985). "Complex–Forming Poly(oxyethylene):Poly(acrylic acid) Interpenetrating Polymer Networks. 1. Preparation, Structure, and Viscoelstic Properties" *Macromolecules* 18(8):1519–1525.
Roh, H.W. et al. (1999). "Effect of cross–link density and hydrophilicity of PU on blood compatability of hydrophobic PS/hydrophilic PU IPNs." *Journal of Biomaterials Science, Polymer Edition* 10(1):123–143.
Ruckenstein, E. et al. (1996), "Poly(acrylic acid)–Poly(vinyl alcohol) Semi– and Interpenetrating Polymer Network Evaporation Membranes" *Journal of Applied Polymer Science* 62:973–987.
Sperling, L. H. et al. (1997). *IPNs Around the World Science and Engineering.* Kim, S. C. et al. Eds, John Wiley & Sons Ltd: New York, p. 1 (Table of Contents).
Turner, J.S. et al. (1998). "Heterogeneous polyelectrolyte gels as stimuli–responsive membranes" *J. Membr. Sci.* 148:207–222.

* cited by examiner

*Primary Examiner*—Robert Dawson
*Assistant Examiner*—Kuo-Liang Peng
(74) *Attorney, Agent, or Firm*—D. W. Eggins

(57) ABSTRACT

The invention relates to a method of making an interpenetrating polymer network (IPN) of at least a first polymer and a second polymer from a first and second component wherein the first component is the first polymer, or a polymerizable reactant selected from monomers or prepolymers polymerizable to the first polymer and mixtures thereof, and the second component is a polymerizable reactant selected from monomers or pre-polymers polymerizable to the second polymer and mixtures thereof, the method comprising the steps of
  forming a reaction mixture of at least the first component, the second component, an initiator or catalyst and a crosslinker,
  effecting polymerization and crosslinking of polymerizable reactant, and recovering the IPN so obtained,
  wherein during the polymerization and crosslinking, a surface of the reaction mixture is maintained in contact with a third component comprising each said polymerizable reactant at a chemical potential similar to the chemical potential of the same reactant in the reaction mixture.

20 Claims, 4 Drawing Sheets

(a)
 (b)
 (c)
 (d)
 (e)
 (f)

(a)

(b)

(c)

(d)

(e)

(f)

(a)

(b)

(c)

(d)

(e)

(f)

PROCESS FOR PREPARING INTERPENETRATING POLYMER NETWORKS OF CONTROLLED MORPHOLOGY

This application claims the priority of U.S. Provisional Patent Ser. No. 60/108,982 filed Nov. 18, 1998 under 35 U.S.C. §119(e) and is incorporated by reference herein in its entirety.

FIELD OF THE INVENTION

This invention relates generally to interpenetrating polymer networks (IPNs). More particularly, the invention relates to a method of making IPNs that aids in the control of the IPN morphology. The invention also relates to novel IPN products.

BACKGROUND OF THE INVENTION

It is known in the field of polymer science that interpenetrating polymer networks (IPNs) are blends or alloys of two or more polymer components, each of which is a crosslinked three-dimensional network. The individual polymer component networks are more or less physically entangled with, but not covalently bonded to the other polymer network(s) in the IPN. The structure of an IPN is frozen by physical interlocking between the component polymer networks [Sperling1997].

A feature of IPNs is that they permit combining advantageous properties from each of two polymers which are normally incompatible. For example, in a hydrophobic-hydrophilic system, flexibility and structural integrity might be imparted by the hydrophobic polymer and lubriciousness might be imparted by the hydrophilic polymer. An IPN may be a bicontinuous system in which each of the polymers form a continuous matrix throughout the network.

Two methods for making IPNs are the sequential polymerization method, and the simultaneous polymerization method. In a typical sequential polymerization method, a solid polymer film (host) is swollen with a monomer (guest) mixture containing an initiator and a crosslinker to form an IPN reaction mixture which is then "cast", or placed, against a solid surface or suspended in a gaseous mixture such as air or nitrogen, and initiated, for example with heat or UV radiation, to initiate polymerization and crosslinking of the monomer(s). Due to the guest monomer's low molecular weight, it can be distributed readily throughout the host polymer. Polymerization and crosslinking of the guest monomer to form a polymer network then results in an entangled polymer network of a first polymer (the host) and a second polymer (derived from the guest).

In a typical simultaneous polymerization method of making IPNs, monomers or prepolymers are mixed along with a polymerization initiator and crosslinking agent of both networks, to form an IPN reaction mixture which is then "cast", or placed, against a solid surface or in contact with a gaseous mixture such as air or nitrogen. Polymerization and crosslinking of the component monomers may occur simultaneously, but by non-interfering reactions, to form an IPN composed of covalently independent but physically entangled component polymeric networks of a first polymer (derived from a first monomer or prepolymer) and a second polymer (derived from a second monomer or prepolymer).

Examples of typical methods of preparation of hydrophobic-hydrophilic IPNs using sequential and simultaneous methods can be found in U.S. Pat. Nos. 5,424,375 and 4,752,624 respectively. In both cases the starting mixtures were cast against glass or solid substrates that were used as molds. Substrates were chosen for their inertness and ease of demolding.

Over the years, variations in the methods used to prepare sequential and simultaneous IPNs have produced materials of widely different properties and morphologies. These include latex IPNs, in which spherical particles having a core-shell structure are formed using emulsion polymerization techniques. The original seed latex of a crosslinked polymer is immersed in a solution of a monomer, together with crosslinker and activator. Also there are gradient IPNs, in which the overall composition within the material varies from location to location on a macroscopic level. Gradient IPNs are prepared by immersing a polymer network in a solution of monomer or prepolymer. Polymerization and crosslinking of the monomer takes place as it diffuses into the host polymer network. A further type are thermoplastic IPNs, also known as polymer blend-IPN hybrids, which are prepared with physical crosslinks rather than chemical crosslinks. These IPNs flow at elevated temperatures, but at room temperature they are crosslinked and behave like IPNs. Yet another type of IPN is the semi-IPN which can be prepared by any of the above methods, in which one or more polymers are crosslinked and one or more polymers remain linear.

U.S. Pat. No. 4,423,099 concerns the preparation of gradient IPNs in which a hydrogel is swollen with water and reactant and then immersed in a medium containing a co-reactant. As the co-reactant is diffused into the host polymer network, an interpenetrated polycondensation polymer is formed within the hydrogel network. The compositional gradient of the polycondensation polymer varies from a high concentration at the surface to zero within the bulk.

U.S. Pat. No. 5,183,859 describes a latex IPN structure formed by a consecutive mutli-stage emulsion polymerization process. A rubbery polymer formed in an earlier stage is covered with a hydrophilic polymer formed in a later stage. The resultant polymer particle comprises a rubbery polymer core and a methacrylic glassy polymer shell.

U.S. Pat. Nos. 4,423,099 and 5,183,859 describe processes carried out to achieve a gradient composition within the IPN.

The methods used in the preparation of gradient IPNs and latex IPNs involve the step of immersion of a polymer network in a solution containing a monomer or prepolymer. This step is for the transfer of monomer/prepolymer into the IPN, and gives a gradient profile ranging from 100% of one polymer component at the surface to 100% of the other polymer component in the centre of the IPN. In the preparation of latex IPNs, monomers or reactants in the immersion solution become covalently linked components of the IPN. In the preparation of a gradient IPN the chemical potentials of the polymerizable reactants in the immersion solution are not the same as the chemical potentials of the same reactants in the reaction mixture. Such IPNs do not have a bicontinuous morphology throughout the IPN.

It has been postulated that there are two distinct mechanisms of phase separation during IPN formation: spinodal decomposition (SD), which form bicontinuous structures of relatively small, interconnected nodular domains of the guest polymer in the host polymer; and nucleation and growth (NG) which forms isolated guest polymer domains (or islands) dispersed in a continuous host polymer phase (sea), also referred to as sea-island morphology. The guest monomer concentration is believed to determine which occurs. In one report of a particular IPN system, it was found that IPNs with guest monomer concentrations of greater than 20% produced a bicontinuous morphology in the bulk of the completed IPN. This very stable morphology characterized by bicontinuity and very small domains is highly desirable for applications such as impact resistance polymers, reinforced elastomers, sound and vibration damping, rubber blend and electrical insulators.

The term "Bicontinuous morphology", generally refers to at least two regions, each of substantially uniform composition which differs from the other, and each of which forms a continuous pathway from one surface of an article to another surface of an article. Thus an IPN having a bicontinuous morphology of hydrophilic and hydrophobic polymers will have two continuous pathways or two sets of continuous pathways extending from one surface of the IPN material to the other surface.

Surprisingly, it has now been reported that even so-called bicontinuous IPNs do not have a bicontinuous morphology at the surface. Murayama [Murayama1993, Murayama1993a] et al prepared hydrophobic and hydrophilic IPNs and concluded that a thin layer of one polymer existed at the surface.

Lipatov [Lipatov1999] suggested that the structure and composition of the surface layers of an IPN which had been formed near the interface with a solid substrate were dependent on the surface energy of that solid substrate.

In other work, it was reported that polyurethane-polystyrene IPNs which had been prepared by a method that included a step of casting the IPN reaction mixture against glass sheets showed a sea-island morphology, and had a surface that was enriched in the polyurethane component which was attributed to the nature of the casting substrate [Rohl 1999].

U.S. Pat. No. 5,424,375, Process for the Manufacture of a Polymeric Material containing Interpenetrated Polysiloxane-Polyacrylic Networks, also reports surface segregation wherein the surface properties were dominated by the polysiloxane component.

U.S. Pat. No. 4,931,287 describes the use of hydrophobic-hydrophilic IPNs to provide a controlled release drug matrix having a sea-island morphology (i.e. not bicontinuous). It was found that delivery of hydrophobic solutes from a continuous hydrophobic matrix with a discrete hydrophilic phase occurred from localized surface regions and then decreased to zero due to a diffusional barrier created by the hydrophobic polymer, even though a significant amount of the drug was still in the matrix. Thus in this case, the lack of bicontinuity was a major drawback of this material IPNs composed of multiple hydrophilic components, at least one of which is stimuli-responsive, have also been reported. A primary goal in these applications has been to improve the wet strength of the responsive hydrogel component. For example, pH-responsive IPNs of poly(vinyl alcohol) and poly(acrylic acid) have been prepared for applications such as drug and protein separation processes, drug delivery systems and pervaporation membranes. Complexation between the two IPN polymer components by hydrogen bonding has also been manipulated via pH and thermal stimuli to produce variable permeability membranes.

U.S. Pat. No. 5,580,929 discloses preparation of an IPN from two gel components, in which the gel underwent a large volume change in response to physical and/or chemical stimulus for use in drug delivery applications.

It may also be advantageous to use hydrophilic-hydrophobic IPN materials for stimuli-responsive applications to provide stronger materials and better control of pulsatile drug release profiles.

Although hydrophilic-hydrophobic IPN materials show great promise in the drug delivery and biomedical fields due to their inherent stability, bicontinuous morphology and small domain size, their lack of bicontinuity at the surface has been a major drawback to their use in a variety of applications. Continuity in the permeable phase is necessary for drug delivery applications, while bicontinuity is required for applications such as contact lens materials and wound healing dressings, where transport of oxygen and water occur in different phases. It has also been reported that a hydrophilic-hydrophobic microdomain structure shows great promise as a blood compatible material[Kataoka1985]. Hydrophilic surfaces of strong elastomeric materials is also a prerequisite for catheter materials.

Conventionally, for the preparation of simultaneous and sequential IPNs, to effect polymerization and crosslinking, the pre-IPN is typically removed from the guest monomer solution and cast against a solid substrate and polymerization and crosslinking is then effected. This procedure affects the surface morphology of the IPN. At the interface between the solid substrate and the pre-IPN surface, surface thermodynamics may result in a surface concentration of one component that is higher than, equal to, or lower than the concentration of that component in the bulk of the IPN. For example, if a hydrophilic guest monomer such as methacrylic acid (MAA) is distributed in polydimethylsiloxane (PDMS), and placed in contact with a hydrophilic substrate such as glass, the higher affinity of glass for MAA relative to PDMS, will result in a preferential enrichment of MAA at the surface—even when equilibrium is reached. Thus, the nature of the casting substrate affects the guest monomer concentration distribution in the pre-IPN, particularly in the surface region of the pre-IPN. Such effects are pronounced in the case of two very different, incompatible compounds such as a hydrophobic polymer/monomer and a hydrophilic polymer/monomer, since the surface energies of the two compounds are very dissimilar.

Furthermore, in the conventional methods for the preparation of sequential IPNs, to effect polymerization and crosslinking, the pre-IPN or reaction mixture is typically removed from the guest monomer solution and cast against a solid substrate and polymerization and cure is then effected. This step exposes the pre-IPN for an uncontrolled amount of time to an environment which contains no monomer. Evaporation of monomer during this step may result in a significant decrease in the concentration of the monomer at and near the surface of the IPN.

It is an object of the present invention to provide an improved method of making IPNs.

It is a further object of the present invention to provide a method of making IPNs which permits improving the surface morphology of the IPN.

It is another object of the present invention to provide an improved IPN product.

SUMMARY OF THE INVENTION

It has now been found that the surface morphology of IPNs can be improved or controlled if the surface of the IPN reaction mixture is in contact with a component that contains all the monomers that are present in the reaction mixture, and at similar chemical potentials to their chemical potentials in the reaction mixture just prior to initiating polymerization, during polymerization and crosslinking instead of the conventional step of casting IPN reacting mixture against a solid substrate such as glass or suspending the IPN reacting mixture in a gas such as air.

It has also now been discovered that the surface properties of the finished IPN can be improved if the crosslinking and polymerization step is effected with the exterior surface of the IPN reaction mixture of IPN precursor is in contact with a substance having a surface tension similar to that of the surface of the IPN reaction mixture or IPN precursor. The present invention seeks to minimize surface segregation—or the preferential enrichment of one or the other component at the surface of an IPN by placing the IPN reaction mixture in contact with a substance having a similar surface tension as the reaction mixture. It is believed that a difference in surface tension causes an adjustment of the composition at the surface to minimize the interfacial energy which results in a permanent change in the morphology of the surface of the finished IPN.

According to one aspect of the present invention there is provided a method of making a sequential interpenetrating polymer network (IPN) of at least a first polymer and a second polymer from a first and second component wherein the first component is the first polymer, and the second component is a polymerizable reactant selected from monomers or pre-polymers polymerizable to the second polymer and mixtures thereof, the method comprising the steps of forming a reaction mixture of at least the first component, the second component, an initiator or catalyst and a crosslinker, wherein the second component, the initiator or catalyst and a crosslinker is absorbed in the polymer network of the first polymer, the reaction mixture forming a surface, effecting polymerization and crosslinking of polymerizable reactant, and recovering the IPN so obtained, wherein during the polymerization and crosslinking, a surface of the reaction mixture is maintained in contact with a third component comprising each said polymerizable reactant of the second component at a chemical potential similar to the chemical potential of the same reactant in the reaction mixture.

According to another aspect of the present invention there is provided a method of making an interpenetrating polymer network (IPN) of at least a first polymer and a second polymer from a first and second component wherein the first component is the first polymer, or a polymerizable reactant selected from monomers or prepolymers polymerizable to the first polymer and mixture thereof, and the second component is a polymerizable reactant selected from monomers or pre-polymers polymerizable to the second polymer and mixtures thereof, the method comprising the steps of forming a reaction mixture of at least the first component, the second component, an initiator or catalyst and a crosslinker, effecting polymerization and crosslinking of polymerizable reactant, and recovering the IPN so obtained, wherein during the polymerization and crosslinking, the reaction mixture is maintained in contact with a third component comprising each said polymerizable reactant of the second component at a similar chemical potential to the chemical potential of that reactant in the reaction mixture just prior to initiating reaction, wherein said third component is substantially free of initiator and crosslinker and wherein said third component has a similar surface tension to the reaction mixture.

According to a further aspect of the present invention there is provided a method of making a simultaneous interpenetrating polymer network (IPN) of at least a first polymer and a second polymer from a first and second component wherein the first component is the first polymer, or a polymerizable reactant selected from monomers or pre-polymers polymerizable to the first polymer and mixtures thereof, and the second component is a polymerizable reactant selected from monomers or pre-polymers polymerizable to the second polymer, and mixture thereof, the method comprising the steps of forming a reaction mixture of at least the first component, the second component, an initiator or catalyst and a crosslinker by mixing, providing means for suspending the reaction mixture in a third component, effecting polymerization and crosslinking of polymerizable reactant, and recovering the IPN so obtained, wherein during the polymerization and crosslinking, the reaction mixture is maintained in contact with the third component, the third component comprising each said polymerizable reactant at a chemical potential similar to the chemical potential of the same reactant in the reaction mixture and wherein said third component is substantially free of crosslinker and initiator or catalyst.

According to another aspect of the present invention there is provided an IPN of a hydrophobic polymer and a hydrophilic polymer wherein the IPN is bicontinuous at a surface of the IPN.

Chemical potential is a term well-known in the art used to describe equilibrium conditions. It is dependent on the concentration of a substance and the medium in which that substance is dissolved in. If a substance is distributed between two different immiscible phases, and if the chemical potential of that substance in the two phases are equal, then that substance is at equilibrium between the phases, and no diffusion of that substance from one phase to the other will occur. This equilibrium condition does not correlate to equal concentrations of the substance in the two phases—except in coincidental circumstances.

It is known in the art that molecules at an interface behave differently and are situated differently from molecules in the bulk. Molecules at the interface are under an assymetrical force field which is termed surface tenstion for free surfaces in contact with gas or interfacial tension for solid-liquid, liquid-liquid or solid-solid interfaces. The magnitude of the surface tension is determined by the internal forces in the substance, thus it is related to the internal energy or cohesive energy of the material. For example, silicone polymers have very low intermolecular forces, consequently they also have low surface tension. Thus the work required to form a surface of siloxane is much lower than for example the work required to form mercury, a substance with a much higher surface tension. Based on thermodynamics, the interface will always attempt to achieve the lowest interfacial free energy. For example, for a polymer/air interface the lowest energy component in the polymer surface will concentrate at the interface. For a polymer/water interface it is energetically desirable to have the most polar functional groups or most polar polymeric components oriented towards the interface.

Although the invention is described with reference to an IPN of two polymers, it is to be understood that IPNs of more than two polymers are included. For example, in a hydrophobic-hydrophilic IPN, either or both of the hydrophobic and hydrophilic components could be a mixture of polymers.

The first and second polymers may be any suitable polymers for a given application. In one embodiment the first polymer is a hydrophobic polymer and the second polymer is a hydrophilic polymer. Either the first or second polymer may be a combination of more than one polymer. Also, additional polymers may be present during formation of the IPN.

The first component, which is polymerizable to the first polymer, is a monomer or a prepolymer which is polymerizable to the first polymer. It can also be the first polymer, for example, in sequential IPN preparation, or a mixture of polymers or polymer networks.

The second component is a monomer which is polymerizable to the second polymer or a prepolymer which is polymerizable to the second polymer.

Either the first or second components, or both, may be mixtures of monomers, of prepolymers or of monomers and prepolymers. Thus it is possible for either the first or second component to provide, upon polymerization and crosslinking, more than one polymer.

The surface of the reaction mixture includes the perimeter outside which substantially no reaction occurs. In the case of a sequential IPN preparation in which the reaction mixture is absorbed in the polymer network of the first polymer, the surface would include the outer surfaces of the first polymer network.

The polymerizable reactants are the monomer or prepolymer components which will form the first or second polymers. In a sequential IPN preparation, the polymerizable reactant would be the monomer or prepolymer of the second component.

The third component may be in contact with the entire surface of the IPN reaction mixture, thereby to obtain an IPN with controlled morphology over the entire surface. In some applications it may not be necessary, or may even be desirable to have the third component in contact with only a part of the total surface of the IPN reaction mixture to produce one or more regions of controlled surface morphology.

The third component comprises the reactants. Thus in a sequential IPN formation, which polymerises and crosslinks a guest monomer in a host polymer, the third component would comprise the guest monomer of the second component. In a simultaneous IPN formation in which two monomers are reactants to be polymerized and crosslinked simultaneously, the third component will comprise a mixture of both monomers from the first component and the second component. Additionally, the reactant or reactants in the third component should be at a similar chemical potential to the chemical potential of the same components in the reaction mixture.

The third component preferably comprises at least the monomer reactants, since the monomer reactants usually have low molecular weights and some may diffuse from the surface of the IPN as it is forming which might adversely affect the surface morphology. Generally, it is also preferred that the third component comprises any prepolymer reactant, although prepolymers usually have a higher molecular weight than monomers and are less likely to diffuse from the network.

Preferably the third component has a similar surface tension to the surface tension of the reaction mixture. For example, if a solvent is used for the reaction mixture, it is preferred to use the same solvent in the third component.

Besides the reactant or reactants, the third component may include other compounds. For example, to achieve the required chemical potential, it may be appropriate to use a cosolvent.

The third component might be in liquid form or a vapour or even a solid such as a gel, with reactant absorbed or otherwise permeating the gel.

Preferably, the third component is substantially free of crosslinker and initiator or catalyst to reduce or eliminate the possibility of further polymerization and crosslinking beyond the surface of the IPN reaction mixture since such further polymerization and crosslinking would result in the covalent attachment of some of the third component to the reaction mixture. Thus, substantially free of crosslinker and initiator or catalyst means that there is not a sufficient amount to adversely affect the surface morphology.

There can also be more than one third component. That is, one portion of the surface of the IPN reaction mixture may be in contact with one third component during polymerization and crosslinking while another portion of the surface of the IPN reaction mixture is in contact with another, different, third component. Further, different third components may be used at different time intervals during the polymerization and crosslinking.

The means for suspending the reaction mixture in the third component may be any suitable means. In one embodiment, in sequential IPN preparation, the means is conveniently the first polymer network. The reaction mixture would then be absorbed within the first polymer network. The means may also be a gel.

An initiator is used if polymerization and crosslinking are by free radical or ionic reaction. A catalyst is used where appropriate for other types of polymerization and crosslinking. The use of initiator or catalyst is well known in the art.

The reaction mixture comprises at least the first and second components, an initiator or catalyst and a crosslinker. If more than two polymers are to be made, appropriate additional monomers or prepolymers would also be present.

In a sequential process using a monomer as the second component, the third component would include the monomer. In a sequential process using a monomer and a co-solvent as the second component, the third component would include the same monomer/co-solvent solution as was used in the host polymer equilibration step. In a simultaneous process using two different monomers, the third component would be a medium which is immiscible with the reaction mixture that contains the two monomers each at the same chemical potential as in the reaction mixture. Therefore the third component might be in liquid form, solid form, vapor form or in the form of a gel. The third component may contain other compounds bearing in mind that any additional compounds should not adversely affect the desired properties of the IPN, and should not in any way adversely influence the desired surface morphology by either changing the surface tension of the source, or by affecting the chemical potential of the monomer in the source.

BRIEF DESCRIPTION OF THE DRAWINGS

The invention will be further described with reference to the accompanying drawings, in which.

DETAILED DISCLOSURE

Figure 1:
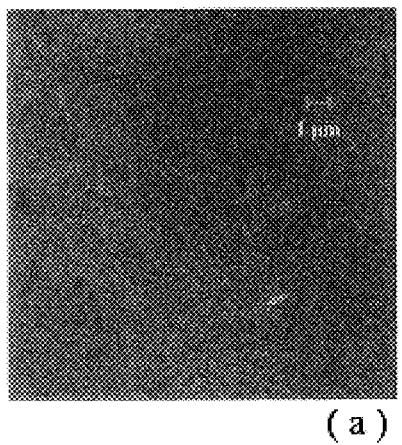
FIGS. 1(a) to 1(f) show a series of laser scanning confocal microscope (LSCM) images of the bicontinuous PDMS-PMAA IPN prepared from Example 1 taken at the surface (a) and at specified depths from the surface of the IPN: (b) 10 µm; (c) 20 µm; (d) 30 µm; (e) 40 µm; (f) 50 µm.
Figure 1:
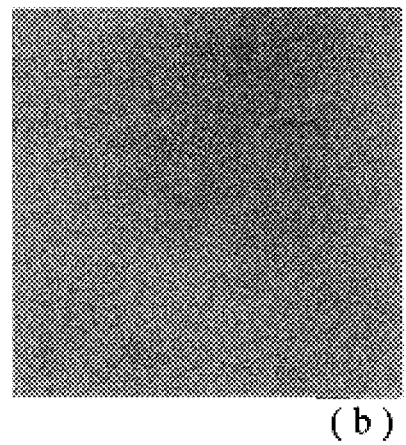
Figure 1:
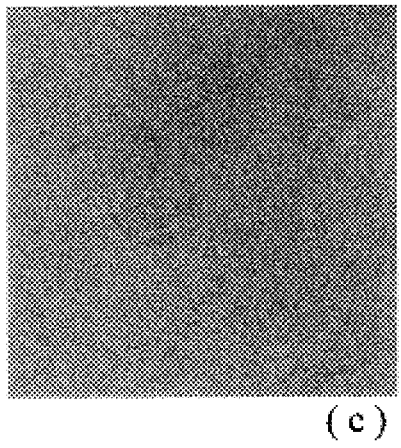
Figure 1:
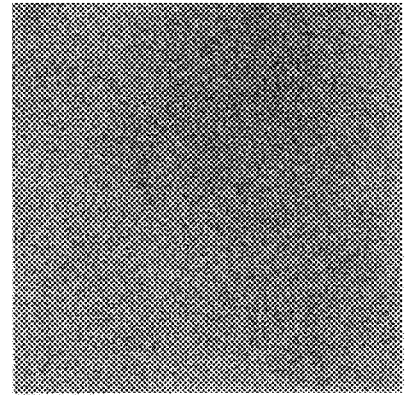
Figure 1:
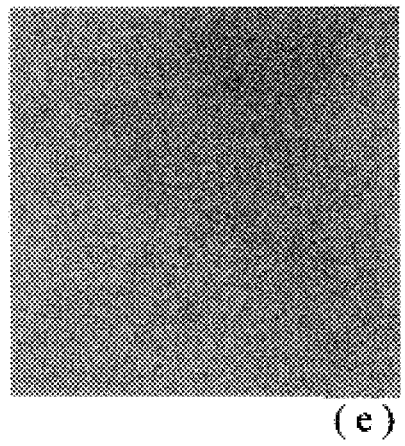
Figure 1:
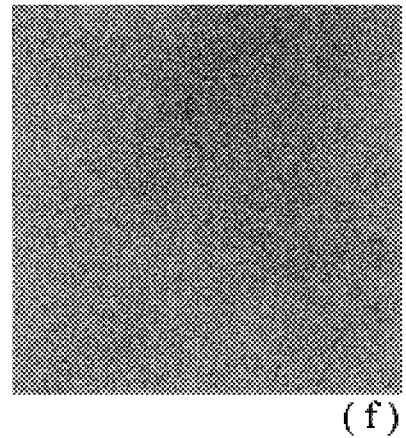

A preferred embodiment of the present is the preparation of a bicontinuous, hydrophilic-hydrophobic, IPN membrane having a uniform composition which spans the thickness of the membrane. The hydrophobic component is the host polymer network and the hydrophilic component is the guest polymer network. The hydrophobic polymer is preferred to be stimuli-responsive, but this invention is not limited to stimuli-responsive hydrophobic polymers which would thus be the first component, and the hydrophilic polymer is preferred to be stimuli-responsive, but this invention is not limited to stimuli-responsive hydrophilic polymers which would thus then be formed from a suitable monomer or prepolymer as the second component. The preferred IPN is prepared using the sequential mode of IPN preparation. In other embodiments, the IPN may be made using the simultaneous method of IPN preparation. In the preferred embodiment both or all polymeric components are crosslinked to form physically distinct but entangled polymeric networks. However, semi-IPNs may also be prepared in which one or more of the polymer components remains linear. This particular embodiment is suitable for a variety of drug delivery membrane or matrix applications which may involve the use of stimuli, and which may produce a variety of drug release profiles that depend on the geometry of membrane or matrix, and include zero order, pulsatile, monotonically decreasing, or arbitrary release profiles controllable by the imposition of stimuli.

It is preferred that the host polymer network comprises the hydrophobic component in order to provide strength and structure to the IPN material, for example, in an aqueous medium. The host polymer network may be chosen from suitable hydrophobic polymers that may include but are not limited to: siloxane polymers such as polydimethylsiloxanes or vinyl containing siloxanes or polymethylhydrosiloxanes, polyethylene-co-vinylacetate (EVA), polypropylene oxide (PPO), polytetramethylene oxide (PTMO), polytetrafluorethylene (PTFE), and polystyrene (PS).

Suitable crosslinking agents for the hydrophobic material may include but are not limited to, any multifunctional silicon hydride containing monomer, comonomer or polymer for vinyl containing siloxanes. Organic peroxides such as benzoyl peroxide and 2,4-dichlorobenzoyl peroxide can be used to thermally cure other siloxanes. Triisocyanates may be used to crosslink PTMO. For some siloxane polymers or prepolymers, either the end groups or the groups along the polymer backbone may be reactive with a multifunctional compound which acts as a crosslinker for the hydrophobic polymer. For example, a preferred hydrophobic material would be a vinyl terminated siloxane such as, polydimethylsiloxane, vinyldimethyl terminated or vinyl-containing siloxane, such as vinylmethyl, dimethylsiloxane copolymer, where the cure or crosslinking is effected in an addition cure system and polyfunctional silicon hydride materials react with the unsaturated groups in the siloxane chain to form siloxane networks. The crosslinker is generally present in an amount of between 0.1%–10% by weight, preferably between 0.5 % and 4% by weight based on the weight of the prepolymer or polymer component. In such addition cure systems, chloroplatinic acid is a preferred catalyst since it has the advantages of being effective at low concentrations and does not require much heat for the reaction to be carried out and does not require a solvent to carry out the reaction. The catalyst is generally present in an amount of between 10 ppm to 200 ppm by weight, preferably between 30 ppm and 100 ppm by weight based on the weight of the siloxane resin.

The range of molecular weight of the hydrophobic polymer can vary from 5,000 daltons to 300,000 daltons. The preferred molecular weight of vinyldimethyl terminated polydimethyl siloxanes for this embodiment ranges from 75,000 daltons to 150,000 daltons. For the preferred embodiment of this invention vinyldimethyl terminated polydimethyl siloxane was used having an average molecular weight of 116,500 daltons.

The molecular weight between crosslinks ($M_c$) of the hydrophobic polymer network may be controlled by the concentration of crosslinker used to form the network and also by the molecular weight of the starting hydrophobic polymer or prepolymer. To further increase the Mc of the polymeric network, chain extenders may also be used. For example, for the vinyl containing siloxane polymer described above, hydride terminated siloxane may be utilized as chain extenders, effectively increasing the molecular weight of the starting silicone polymer. The molecular weight of the chain extender may vary from 100 daltons to 5,000 daltons, preferably between 500 daltons to 2,000 daltons. The chain extender is generally present in an amount of between 0.5% to 20 % by weight, preferably between 5% and 10% by weight based on the weight of the siloxane resin.

In the preferred embodiment the divinylterminated dimethylsiloxane resin, the polyfunctional silicone hydride crosslinker, the chloroplatinic acid catalyst and hydride terminated siloxane chain extender are mixed together and cast against a suitable substrate such as poly(ethylene terephthalate) or poly(tetrafluoroethylene), so that the final thickness of the crosslinked polymer network may vary from 0.2 mm to 1.5 mm. The cast resin is first placed under vacuum of 20–25 mm Hg to remove all air bubbles from the mixture and then placed in an oven at a temperature which may range from 40 C. to 150 C., preferably between 50 C. and 100 C., in order to initiate the addition-cure of the vinyl terminated siloxane resin. The formed siloxane polymer network is washed extensively in a suitable solvent such as cyclohexane, toluene, benzene or xylene. Due to the importance of the $M_c$ of the hydrophobic polymer network in sequential IPN preparations for the properties of the resultant IPN, it is then determined using the Flory-Rehner equation as described in example one.

Control of the $M_c$ of the host polymer network is important because, as is known in the art, it controls the retractive pressure of the elastomeric polymer network. When the IPN material is to be used as a stimuli-responsive material the host polymer network must expand and retract to accommodate for the volume changes of the hydrophilic component. The $M_c$ of the host polymer network also affects the domain size of the guest polymer phase for IPNs prepared using the sequential method of IPN preparation. The domain size of the guest polymer phase, in turn, affects properties of the resultant IPN material, such as optical clarity, permeability, and mechanical strength. For example, when domain sizes of the hydrophilic portion are less than 20 nm, then the resultant film is clear and can be used in applications such as an ocular lens or an intraocular lens. In applications where the membrane is used for separation processes, for example the separation of different molecular weight solutes, the domain size of the hydrogel phase may be chosen so that it is permeable to a solute less than a particular molecular weight range, but not permeable to solutes falling above this molecular weight range. In these applications, the domain size of the hydrogel phase may be used to control the molecular weight cut off of the membrane.

It is preferred that the hydrophobic polymer be elastomeric as well as biocompatible, but the invention is not limited to this type of material. For example, it is preferred that the host polymer network be chosen from the family of siloxane polymers. Siloxane polymers are known in the art to be biocompatible and therefore are widely used in the manufacture of biomedical devices. Siloxanes are not water permeable, but are permeable to $O_2$. They are inert and can have a high elongation at break dependent on the molecular weight between crosslinks ($M_c$) of the crosslinked polymer. They also have a low surface energy and when used in mixtures of multicomponent blends or copolymers are known to undergo surface segregation, forming a layer of the hydrophobic polymer on the surface of the multicomponent material. Multicomponent IPNs which contain a siloxane should not undergo the same type of surface segregation as polymer blends or copolymers once the components which make up the IPN have become crosslinked. However, it has been found that surface segregation of the siloxane component occurs before the IPN is formed due to exposure to air and/or using air or another hydrophobic material as a casting substrate for the reacting IPN. One of the advantages of the present invention is the reduction or elimination of surface segregation of the PDMS component in order to produce a surface of the reacting IPN which contains both guest polymer and siloxane phases.

The hydrophobic, siloxane host polymer network of the preferred embodiment is placed in a solution of the hydrophilic guest monomer, which also includes the crosslinking agent and initiator. The guest monomer solution and its constituents diffuse into the host polymer network for a time sufficient to achieve the desired concentration or penetration of the guest monomer.

The hydrophilic second component constituents may be any crosslinkable water soluble polymer, prepolymer, copolymer which include but are not limited to: poly(acrylic acid), poly(methacrylic acid), polyethylene oxide (PEO), poly(N-isopolyacrylamide), or polymers of hydroxyl-substituted lower alkyl acrylates, methacrylates, acrylamide, methacrylamide, lower allylacrylamides and methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-inylpruidine, vinylically unsaturated carboxylic acids having a total of 3 to 5 carbon atoms, amino-lower alkyl (where the term 'amino" also includes quaternary ammonium), mono-lower alkylamino-lower alkyl and di-lower alkylamino-lower alkyl acrylates and methacrylates, allyl alcohol and the like.

Preferred monomers for the hydrophilic constituent are N-vinyl-2-pyrrolidone, acrylamide, methacrylamide, hydroxyl-substituted lower alkylacrylamides and -methacrylamides and vinylically unsaturated carboxylic acids having a total of 3 to 5 carbon atoms such as methacrylic acid, acrylic acid, isopropylacrylamide.

In general the following compounds (polyunsaturated comonomers) are examples of suitable crosslinking agents for the hydrophilic material allyl (meth)acrylate, lower alkylene glycol di(meth)acrylate, poly(lower alkylene)glycol di (meth)acrylate, lower alkylene di(meth)acrylate, divinyl ether, divinyl sulfone, di and trivinyl benzene, trimethylolpropane tri(meth)acrylate, pentaerytritol tetra (methacrylate), bisphenol A di(meth)acryalte, bisphenol A di(meth)acrylate, methylenebi(meth)acrylamide, triallyl phthalate and diallyl phthalate. Suitable crosslinker for PEO may be triisocyanate. The crosslinker for the hydrophilic component is generally present in an amount of between 0.1%–10% by weight, preferably between 0.5% and 4% by weight based on the weight of the polymerizable monomer.

Thermal initiators, agents which form free radicals upon heating, may include azoisobutyronitirile (AIBN), potassium peroxodisulfate, dibenzoyl peroxide, hydrogen peroxide, or sodium percarbonate, but are not limited to this list. Photoinitiators, agents which form free radicals by use of light, in particular UV light of a suitable wavelength, may include, when using acrylates as the polymerizable monomer, suitable polymerizable initiators such as benzoin ethers, for example, isopropyl benzoin ether and butyl benzoin ether. They may also include 1-hydroxycyclohexyl phenyl ketone and benzophenones and Michler's ketone and acetophenones such as 2,2-dimethoxyphenyl acetophenone, but are not limited to this list. The polymerization initiator for the hydrophilic monomer or prepolymer is present in an amount between 0.2% to 8%, preferably between 0.5% and 4% by weight based upon the weight of the polymerizable monomer or prepolymer.

A co-solvent may be used to aid in the diffusion and imbibition of monomer into the host polymer network. Suitable cosolvents may include organic, nonpolar solvents such as cyclohexane, chloroform, benzene, toluene, methylene chloride, chlorobenzene, chlorotoluene, methyl ethyl ketone, cyclic aromatics and halogenated cyclic aromatics, dimethylacetamide or N-methylpyrollidone. The cosolvent may be include in the monomer solution at a volume ratio of 0.1:20 to 4:20, preferably between 0.5:20 to 2:20 based upon the volume of the monomer.

In the preferred embodiment for the preparation of a pH-responsive, hydrophilic-hydrophobic, bicontinuous IPN membrane, the hydrophobic material is vinyl terminated polydimethylsiloxane, which has been crosslinked with a cyclic, multifunctional silicon hydride material such as 1,3,5,7-tetramethylcyclotetrasiloxane. The hydrophilic material is methacrylic acid monomer with triethyleneglycol dimethacrylate as the crosslinking agent and 2,2-dimethoxyphenyl acetophenone as the photoinitiator. The ratio of PDMS to PMAA in the resultant dry material may vary from 9:1 to 1:9., more typically in the range of 8:2 to 5:5.

The guest monomer may be an ionic vinyl monomer, which when polymerized and cured forms a polyelectrolyte gel. Polyelectrolyte gels have stimuli-responsive properties which when incorporated in an IPN allow the IPN to respond and change, most notably its hydration, as a function of an applied stimulus. Monomers may be ionic and therefore may be able to respond to stimuli such as pH, ionic strength and electric field or electric current. The monomers of a wide variety of stimuli-responsive polymers may be chosen with applied stimuli further including heat and chemical agents.

The change in hydration of polyelectrolyte gels has been exploited in the past to form stimuli-responsive drug delivery materials, since diffusion of a solute through a gel decreases as the hydration decreases. However, it has been found that the on/off drug delivery ratio of hydrogels is not very large, because the change in hydration of such a system is not very large. For a polyelectrolyte gel the on/off ratio has been measured at 7 (Turner 1998). Percolation may also be a mechanism of permeation control. Changes in the percolating gel volume fraction as well as the hydration of the a polyelectrolyte gel can act synergistically to enhance the on/off drug delivery ratio of siloxane-polyelectrolyte gel composite materials, resulting in an on/off ratio of 160 for high molecular weight solutes such as vitamin $B_{12}$[Turner 1998]. When the same materials were used to prepare pH responsive polydimethylsiloxane-poly (methacrylic acid) (PDMS-PMAA) IPN membranes, no flux was observed at pH 3 conditions for a 2 month period giving an approximate off permeability of $10^{-13}$ $cm^2/s$ and an on/off ratio of $6.5 \times 10^5$ (can refer to FIG. 4 here if appropriate).

In this embodiment, once the reaction mixture, comprising the hydrophobic polymer network, hydrophilic second component, as well as crosslinking agent and initiator of the hydrophilic component, is combined, it is brought in contact with a third component which has been selected, to control and maintain a uniform monomer concentration at least at the surface of the reaction mixture.

The distribution or concentration gradient of the guest monomer in the reaction mixture is an important parameter. It is known in the art that guest monomer concentration determines the eventual guest polymer concentration profile in the IPN, as well as, the phase morphology—i.e. how the two phases are distributed in and around each other within the IPN.

In either the sequential or the simultaneous polymerization method, the distribution of monomer(s) or prepolymer(s) in the reaction mixture, the handling procedures, and the nature of any compound which is brought into contact with the reaction mixture will determine the distribution of monomer(s) or prepolymer(s) in the IPN reaction mixture and whether surface segregation or redistribution of the monomer or pre-polymer occurs. If the monomer concentration at the surface region of the pre-IPN mixture is made to decrease, for example, to concentrations ranging from 0–15%, then it has been shown, and it is known in the art, that a bicontinuous morphology will not be formed at the surface of the IPN. Instead, the morphology will consist of dispersed hydrophilic domains in a continuous hydrophobic matrix. Such morphology occurs when IPN reaction mixtures are cast against a solid substrate or exposed to a gaseous mixture during the polymerization and crosslinking of the reaction mixture. Such a morphology has significant limitations on the permeability, and biocompatability of the resultant IPN and its use in biomedical devices.

The present invention seeks to maintain the IPN reaction mixture, or a surface of the IPN reaction mixture, in contact with a third component, during polymerization and crosslinking, to maintain a desired monomer or prepolymer concentration at the surface; in some embodiments, to maintain the same monomer or prepolymer concentration level at the surface, as in the bulk. For the preferred embodiment of this invention, the monomer concentration levels within the bulk and the surface of the IPN may range from 40% to 60% with respect to the weight of the host polymer network, but preferably they are 50% with respect to the weight of the host polymer network. The monomer concentrations at the surface and the bulk thus can be maintained uniform because the chemical potential of the third component and the surface tension of the third component are very similar to, preferably substantially the same as, the chemical potential of the monomer in the reaction mixture and the surface tension of the reaction mixture.

In order to maintain a uniform concentration gradient within the bulk and surface of the IPN the third component in a preferred embodiment is chosen to comprise methacrylic acid monomer of the second component. The third component may exist as a vapor, a solid containing imbibed monomer or preferably as a liquid. If the liquid used as the third component includes the same solvent as previously used to imbibe monomer into the first component or host polymer, then the concentration of monomer, in the third component is chosen to be substantially the same as the concentration of the monomer in the immersion solution which was previously used to imbibe the second component into the reaction mixture. This provides for a third component which contains a monomer with a chemical potential which is substantially the same as to the chemical potential of the monomer in the reaction mixture.

For free radical or ionic polymerization, the IPN reaction mixture and the third component are preferably degassed to remove oxygen, which is known in the art to inhibit the free radical polymerization and crosslinking of vinyl monomers such as those used for the second component, by combining and rendering ineffective the free radical initiator. In order to remove all oxygen from the IPN reaction mixture and the third component, degassing using $N_2$ suitably takes place at this step for a time ranging from 5 min to 1 h, depending upon the volume of the mixture to be degassed. For the IPN reaction mixture and third component of the preferred embodiment which have a volume of approximately 20 $\mu L$, they are degassed for approximately 20 min each.

In a preferred embodiment, polymerization and crosslinking of the IPN reaction mixture occurs while the entire surface of the reaction mixture is in contact with the third component. The polymerization and crosslinking reactions may be initiated by heat, but preferably they are initiated by application of ultraviolet (UV) radiation using UV lights from a UV reactor system. The wavelength of UV radiation may range from 250 nm to 450 nm depending upon the particular UV initiator used. In one embodiment, the preferred wavelength of UV radiation is 350 nm. The intensity of the UV lights may range from 20 W to more than 100 W. The intensity of the preferred embodiment is 32 W. Care must be taken to regulate the temperature during the reaction of the IPN reaction mixture since temperature may also affect the rate of the polymerization and crosslinking reactions. Heat may evolve due to the UV lights and also from the reaction mixture. In one embodiment the temperature is maintained at approximately 50° C., but can range from 20° C. to 80° C. without significant adverse effect on the final IPN product formed.

Once the PDMS-PMAA IPN has formed, it is immersed in water to wash away all of the unreacted components.

Another preferred embodiment is the preparation of a bicontinuous, pH-responsive, hydrophilic-hydrophobic IPN membrane or matrix, in which a stimuli-responsive second guest polymer hydrogel, is localized at the surface region of the IPN material and a non-responsive first guest polymer hydrogel, is located in the bulk of the IPN. Such an IPN would be useful in rate controlled drug delivery or other applications of mass transfer. By confining the stimuli-responsive portion of the hydrogel phase to the surface this would further increase the response time of the material and reduce the volume change associated with change in hydration of the material.

In this embodiment the host polymer network described above is first placed in a first monomer such as vinyl pyrolidone, as the non-responsive first hydrogel. Depending upon the compatibility between the monomer and the host polymer network, a cosolvent may be used to aid the diffusion of the monomer into the host polymer network. Immersion in the first monomer is maintained until a uniform concentration gradient is developed. The membrane is then removed from the monomer solution and placed in a solution of the second monomer having the same crosslinking agent, initiator and cosolvent concentration, so that a driving force for diffusion of the two monomers in the opposite directions occurs. That is, where the first monomer begins to diffuse from the surface of the host polymer network into the second monomer solution, and the second monomer begins to diffuse from the surrounding solution into the host polymer network, resulting in a region at the surface which is relatively lower in the concentration of the first monomer and relatively higher in the concentration of the second monomer. The reaction mixture so formed is then immersed into a pure second monomer liquid, and polymerization and crosslinking of both monomers is effected, producing an IPN which has a surface region concentrated in the responsive second hydrogel, adjacent to the bulk of the IPN which is concentrated the non-responsive first hydrogel.

Another embodiment is the preparation of a drug delivery matrix, in which the drug solute is mixed with the host polymer network during formation of the IPN. A further embodiment is the preparation of a bicontinuous, hydrophilic-hydrophobic IPN in which the host polymer network has an Mc of 5,000 daltons. The IPN is prepared as described above, resulting in an optically clear IPN when swollen in a physiological buffer solution.

A hydrophobic-hydrophilic IPN material prepared according to the invention may be a permeable membrane which allows water soluble solutes to diffuse through the interconnected hydrogel domains or channels. Because the hydrophobic phase is also continuous and hydrophobic, water insoluble solutes may also diffuse through this phase. Thus the IPN is permeable to a wide range of solutes. This is very useful for applications such as contact lens and wound dressing, where it is important that both $O_2$ and water are able to diffuse from one surface of the device/material to the other surface. The permeability through the IPN is also dependent upon the molecular weight of the solutes. For the water soluble solutes, the size and hydration of the domains determines the permeability and flux of solutes through the membrane. The size of the domains can be predetermined during the preparation of the IPN and will depend largely on the Mc of the host polymer network, as well as the guest monomer concentration and the particular mechanism of phase separation. When the hydrogel component is stimuli responsive such as in a polyelectrolyte gel, the hydration of the gel domain, as well as the gel volume may change as a function of pH. For example, for polyelectrolyte gels such as methacrylic acid which has a pKa of 5.5, the hydration of the gel changes with pH. At a pH of 7, the gel is ionized and swells to a hydration of 0.94, at pH 3, the gel deswells to a hydration of 0.6. Thus the change in domain size, as well as hydration (since diffusion is dependent upon hydration) may either decrease or stop the flux of water-soluble solutes of a certain size. Such a property, which may also be referred as variable permeability, the ability to change permeation of solutes as a function of applied stimulus, may be applied both in separation technologies as well as drug delivery. Moreover, the change in the permeation of the solute is fully reversible. Also, because of the small domain size of the IPN, the time required to effect this change in permeability is very fast. Since diffusion is proportional to the square root of the radius, the smaller the domain the faster the response of the material to a change in the pH of the surrounding environment.

As has been discussed above, the method of the invention is useful to prepare IPNs for stimuli-responsive drug delivery membranes and matrices, in wound healing dressings, as biocompatible coatings for bio medical devices such as blood-contacting catheters and for contact and intraocular lenses.

The following examples are provided to illustrate the invention, they are not intended to limit the nature or scope of the invention. Examples 2 and 3 are for comparison purposes only.

EXAMPLE ONE (a) The polysiloxane network, the hydrophobic host polymer network of the IPN system, was synthesized as follows.

100 g of vinylterminated, polydimethylsiloxane (PDMS) polymer having a molecular weight of approximately 116,000 daltons and a viscosity of 65,000 cst was placed in a wide-mouth glass jar to which was added 6 mg of platinum divinyltetra-methyldisiloxane complex to yield a PDMS resin containing a 60 ppm platinum catalyst. From this platinum-containing PDMS resin, 10 g were taken and mixed with 0.4 g of 1,3,5,7-tetramethylcyclotetrasiloxane, a cyclic, multifunctional silicone hydride crosslinker.

The resin was then spread to a thickness of approximately 0.45 μm on a mylar sheet. Polyethylene (PE) strips of 0.45 μm in thickness were placed onto the mylar sheets using vacuum grease to form the outline of a rectangle. The resin was then placed within the PE strips and spread using a sharp, straight edge so that the thickness of the silicone resin was the same as the thickness of the PE strips. The film of uncured resin was then placed under a vacuum of 25 mm Hg for approximately 6 hours in order to remove any entrapped air bubbles within the bulk of the resin. The silicone resin was then placed in an oven having a temperature of 55° C. for 24 hours to effect the hydrosilyation addition-cure. When the cured PDMS resin was removed from the oven, it was allowed to cool and then die cut into circular sections with diameters of 33 mm. Each circular section was placed in cyclohexane with mixing. Cyclohexane is a very good solvent for PDMS and thus the PDMS is swelled to a high degree, allowing any unreacted PDMS components which are not part of the PDMS network to be removed.

(b) The extent of swelling in cyclohexane was used to determine the molecular weight between crosslinks of the PDMS polymer network using the Flory-Rehner Equation for Molecular Weight between Crosslinks (Mc) based on the assumptions that (1) the expansion of the network is isotropic and (2) Volume fraction of the elastomer network is calculated assuming additivity of volumes, where:

$$M_c = (-\rho V_1 (v^{1/3}_{2m} - v_{2m}))/(\ln(1-v_{2m}) + \chi v^2_{2m} + v_{2m})$$

where

ρ is the density of the elastomer network before swelling $V_1$ is the molar volume of the solvent at room temperature $v_{2m}$ is the volume fraction of the elastomer network at swollen state χ is the polymer-solvent interaction parameter The polymer-solvent interaction parameter χ, which accounts for the specific interactions between polymer segments and solvent molecules in a particular polymer-solvent systems, was estimated by the following equation:

$$\chi = 0.435 - 0.014 v_2; \text{ where } v_2 = 1.0156 v_{2m} + 0.1924 v_{2m2m}^2 - 0.5897 v_{2m}^3 + 0.666 v_{2m}^4$$

The volume fraction $v_{2m}$ is determined by swelling the PDMS network in cyclohexane to equilibrium, measuring the swollen mass and dry mass of the network, and using the following equation:

$$i\ v_{2m}=(M_o/\rho_{PDMS})/((M_o/\rho_{PDMS})+(M_f-M_o)/\rho_{cyc})$$

where $M_o$ is the dry mass of the PDMS network in grams $M_f$ is the swollen mass of the PDMS network in grams $\rho_{PDMS}$ is the density of the PDMS network in g/L $\rho_{cyc}$ is the density of cyclohexane in g/L Table 1 illustrates how Mc of the PDMS network varies as a function of the % crosslinker used in the formulation. Quantities of crosslinker less than 3% and the PDMS network could not be handled, it was very sticky and would lose its form. Quantities of crosslinker above 5% did not decrease the Mc of the PDMS network any further. The $M_c$ of the PDMS network prepared in example 1 was 30,000 daltons.

TABLE 1

| % crosslinker | $M_c$ of PDMS (daltons) |
|---|---|
| 3 | 100,000 |
| 3.5 | 50,000 |
| 4 | 30,000 |
| 5 | 15,000 |

(c) After swelling in cyclohexane, the circular PDMS network was placed on an aluminum foil, dried to a constant mass and both surfaces of the film were wiped clean using cyclohexane. The dry PDMS films were stored in capped vials. After that, the films were handled only with tweezers to avoid any possible contamination to the surface of the PDMS network. The PDMS network was then suspended within a 20 mL glass scintillation vial containing 18 mL of methacrylic acid monomer along with 0.18 g (or 1% by weight)of 2,2-dimethoxyacetophenone, the UV sensitive free radical initiator and 180 µL of triethylene glycol dimethacrylate, the crosslinker, for approximately 18 h or until the diffusion of monomer into the PDMS network reached to equilibrium. At equilibrium the PDMS network had increased its weight by approximately 100% due to the imbibed monomer solution. Thus the reaction mixture at pre-IPN film contained 50% MAA solution with crosslinker and initiator.

(d) A rubber gasket was used to replace the screw cap in the scintillation vial opening. Two syringe needles were used to pierce the gasket. One of the needles was immersed into the surrounding monomer solution to act as the $N_2$ inlet and the other needle was placed in the air space just above the monomer solution, and acted as a vent or outlet. The monomer solution with the swollen PDMS network was purged with $N_2$ for 20 minutes, at which point the vial with swollen PDMS was placed in an inert glove bag, filled with $N_2$. A clean glass scintillation vial containing a section of upright, glass in the middle of the vial was attached to the inside, bottom surface of the glass vial using an adhesive such as Crazy Glue™ and was filled with 18 mL of methacrylic acid monomer only. The glass insert was used to maintain the film in a vertical position, but did not actually touch the surface of the film. The monomer liquid was purged with $N_2$ using the same method as described above for a total of 20 minutes. This vial was also placed in the inert glove bag and the swollen PDMS film was quickly transferred into the monomer only containing vial. This system was immediately capped, and placed under UV lights having an intensity of 32 W and a wavelength of 350 nm. The film was placed in this UV reactor for a one hour period. After an hour, the resultant IPN was a very hard, tough crystalline material and was surrounded by a solid suspension of the polymerized monomer which surrounded the IPN. The vial was broken open and the surrounding monomer along with any polymer which may have formed due to initiation of monomer from the surface of the IPN was removed. The IPN was washed extensively in distilled water to remove any unreacted component and to swell the resultant IPN.

EXAMPLE TWO

PDMS-PMAA IPNs were prepared as in Example 1 (a), (b), and (c), with the exception of section (d). In section (d), the pre-IPN mixture was placed in contact with glass. This procedure is commonly used to prepare IPNs presently known in the art. The example is included here to show how the morphology of the IPN material prepared from the method described in EXAMPLE 2 varies significantly from the morphology of the material prepared in EXAMPLE 1.

(d) The pre-IPN film was removed from solution and placed between two glass microscope cover slides (50 mm×45mm, 1 oz.). This transfer took place in a $N_2$ environment. EVA spacers, the same thickness as the swollen pre-IPN films and covered with a film of silicone grease, were placed along the edges of the cover slides, in order to provide a closed environment for the pre-IPN film and good contact between the glass substrate and pre-IPN surface. The glass slides surrounding the pre-IPN film were then clamped together and the whole glass-pre-IPN system was placed under UV lights having an intensity of 32 W and a wavelength of 350 nm. The film was placed in this UV reactor for a one hour period. After an hour, the resultant IPN was a very hard, tough crystalline material. The edges of the glass slides surrounding the IPN film and containing the EVA spacers were broken off and the IPN film with glass slide were placed in distilled water for washing. As the IPN film swelled in water the glass slide lost contact with the IPN surface and was removed from solution. Washing of the IPN continued until a constant swelling mass was reached, approximately 4 weeks.

EXAMPLE THREE

This is an example of a procedure to prepare PDMS-PMAA IPNs which are in contact with $N_2$ during the polymerization and cure of the pre-IPN mixture. The example is carried out here to show how the morphology of the IPN material prepared from the method described in EXAMPLE 3 varies significantly from the morphology of the material prepared in EXAMPLE 1 of the present invention.

The host PDMS network and the Pre-IPN Film were formed in the same manner as in Example One (a), (b) and (c) except that prior to being placed in monomer solution the PDMS network was threaded with a thin piece of nylon at the edge of the film.

(d) The pre-IPN film was removed from solution and suspended in a vial which had been purged with $N_2$. Care was taken that the pre-IPN film did not contact the vial, but was surrounded only by the $N_2$ atmosphere. This transfer took place in a $N_2$ environment. The vial was capped and placed under UV lights having an intensity of 32 W and a wavelength of 350 nm. The film is placed in this UV reactor for a one hour period. After an hour, the resultant IPN was a very hard, tough crystalline material. The vial was filled with distilled water and the IPN film was washed with distilled water until a constant swelling mass was reached, approximately 4 weeks.

EXAMPLE 4

The morphology of the PDMS-PMAA IPNs prepared in Examples 1, 2 and 3 was examined using a laser scanning confocal microscope (LSCM). LSCM studies were carried out using an inverted microscope, the Carl Zeiss LSM 510 using a 488 nm Argon laser. Two dimensional optical sections at different depths along the optical axis of the microscope (z direction) were taken with a water-immersible x63 objective lens (N.A.=1.2). The size of the images obtained in the x-y plane was 29.2 $\mu$m×29.2 $\mu$m. The image was captured with a resolution of 512 pixels×512 pixels and 8 bit grayscale depth. Resolution along the z-axis was 0.65 $\mu$m. The spatial resolution was approximately 244 nm. Images were taken at the surface and at corresponding planes below the surface at 1 $\mu$m intervals.

Use of a fluorescent marker (fluorescein sodium salt) to distinguish the hydrogel domains from the rubbery network allowed for sharp image contrast between the rubber and hydrogel regions. The red regions in the LSCM images represent PMAA hydrogels domains that were accessible to fluorescein when IPN films were placed in fluorescein solution, i.e. those that were connected to the external surfaces, including the faces as well as the circumferential surfaces, of the IPNs. The black regions represent fluorescein-free portions of the IPNs, either PDMS or isolated PMAA hydrogel domains which were inaccessible to fluorescein.

Laser scanning confocal microscope (LSCM) images of the IPN prepared in Example 1 and swollen in pH 7 phosphate buffer solution are shown in FIG. 1 starting at the surface of the IPN, and progressing into the bulk of the IPN to a depth of 50 $\mu$m. There was a slightly lower concentration of PMAA regions at the surface of the IPN (FIGS. 1(a)). This was attributed to the diffusional release of crosslinking agent and initiator from the pre-IPN film when it was placed in pure MAA monomer prior to UV irradiation. The diffusional release would slow considerably as polymerization and crosslinking progressed, thus isolating MAA depletion to only near the surface.

The qualitative morphological features of the PDMS-PMAA IPN prepared by the monomer immersion method were similar throughout the IPN. The IPN consisted of uniformly dispersed hydrogel domains (approximately 100–200 nm in dimension) within the host PDMS network. The morphology was characteristic of bicontinuous structures formed by the phase separation mechanism known in the art as spinodal decomposition.

Figure 2:
FIGS. 2(a) to 2(f) show a series of laser scanning confocal microscope (LSCM) images of the PDMS-PMAA IPN prepared from Example 2, taken at the surface (a) and at specified depths from the surface of the IPN: (b) 5 µm; (c) 10 µm; (d) 40 µm; (e) 50 µm; (f) 60 µm.
Figure 2:
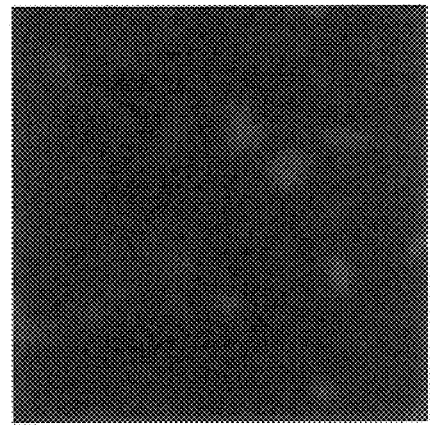
Figure 2:
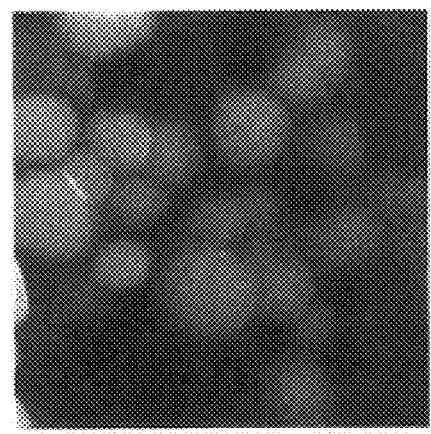
Figure 2:
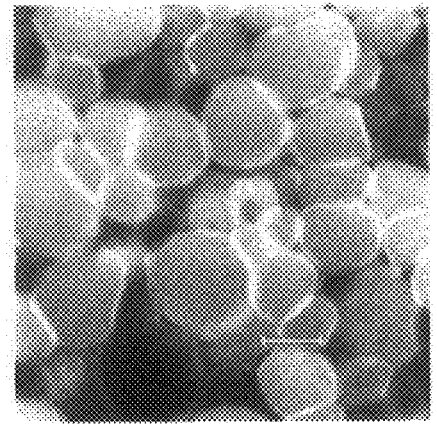
Figure 2:
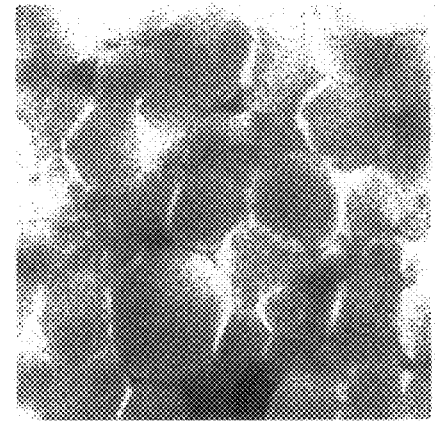
Figure 2:
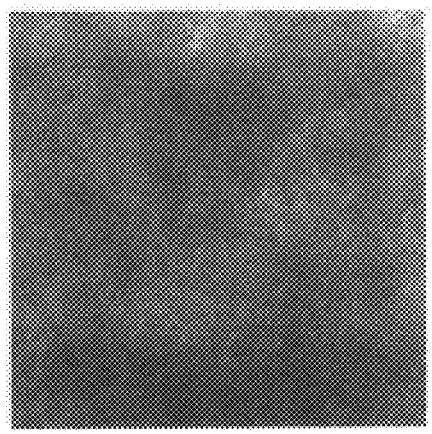

LSCM images of the IPN prepared in Example 2 and swollen in pH 7 phosphate buffer solution are shown in FIG. 2 starting at the surface of the IPN, and progressing into the bulk of the IPN to a depth of 60 $\mu$m. An image taken at the surface (FIG. 2(a)) shows large (0.5–2 $\mu$m) irregular PMAA hydrogel domains. Images taken between 1 $\mu$m and 12 $\mu$m below the surface were all black (FIG. 2(b)) implying that either no hydrogel domains were present, or that any hydrogel domains which might be present were encapsulated in PDMS and inaccessible to fluorescein. The latter scenario is typical of a dispersed sea-island morphology formed by the nucleation and growth phase separation mechanism, and is indicative of low monomer concentrations in the pre-IPN film. It is believed that isolated gel domains existed in this area due to the low monomer concentration created during the evaporation of monomer prior to placing against the glass substrate and due to migration of the monomer to the glass substrate interface. A layer with such a morphology would be impermeable to water-soluble compounds such as fluorescein and vitamin B$_{12}$ and render the hydrogel phase discontinuous at the surface of the IPN material. At a depth of 14 $\mu$m, spherical, connected hydrogel domains of approximately 3–5 $\mu$m in diameter were visible (FIG. 2(c)). From 14 to 18 $\mu$m in depth (FIG. 2(d)), the spherical hydrogel domains increased in concentration. At 24 $\mu$m (FIG. 2(e)), spherical domains were still visible, however, the presence of small nodular domains within the spheres became evident. This region of dual phase morphology, where large dispersed spheres have begun to connect forming a bicontinuous, permeable structure due to the phase separation taking place by both spinodal decomposition and nucleation and growth, is clearly evident in the LSCM images. This region represents a transition in mechanisms of phase separation, and is consistent with a higher monomer concentration than the surface layer. At 30 $\mu$m (FIG. 2(f)) only small, nodular gel domain morphology was present, and this morphology continued to a depth of about 60 $\mu$m. Monomer concentration had increased so that only spinodal decomposition occurred at this depth.

Figure 3:
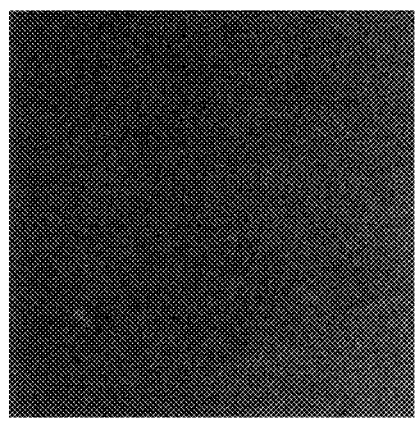
FIGS. 3(a) to 3(f) show a series of laser scanning confocal microscope (LSCM) images of PDMS-PMAA IPN material prepared from Example 3, taken at the surface (a) and at specified depths from the surface of the IPN: (b) 2 μm; (c) 14 μm; (d) 18 μm (e) 24 μm; (f) 30 μm.
Figure 3:
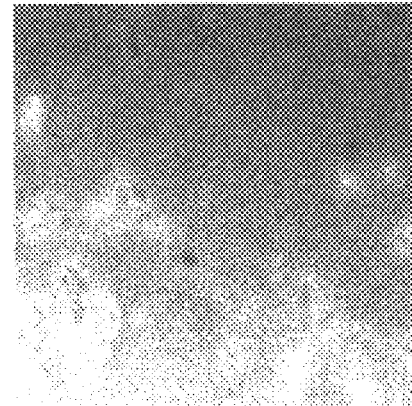
Figure 3:
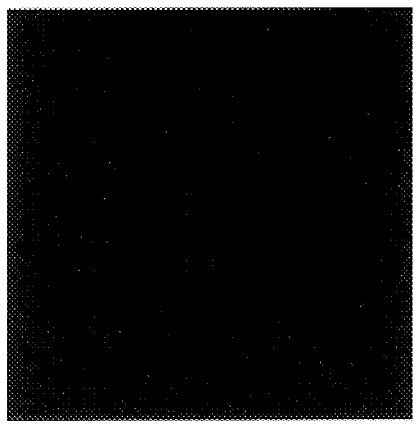
Figure 3:
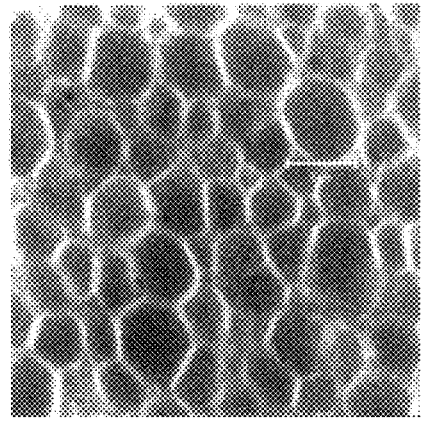
Figure 3:
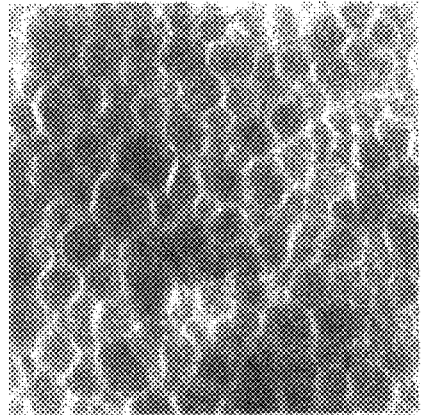
Figure 3:
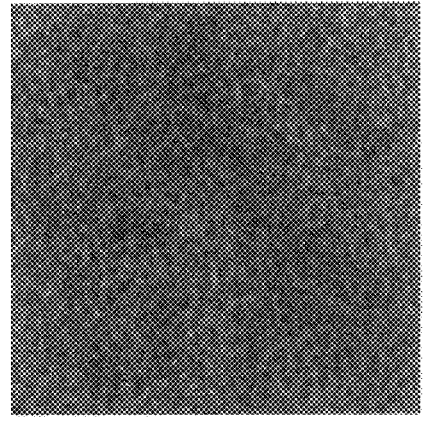

LSCM images of the PDMS-PMAA IPN prepared in Example 3 and swollen in pH 7 phosphate buffer solution are shown in FIG. 3 starting at the surface of the IPN, and progressing into the bulk of the IPN to a depth of 30 $\mu$m. At the surface of the IPN (FIG. 3(a)), there is a PDMS-enriched layer with some relatively small, nodular gel domains. Similar nodular gel domains were also visible at 5 $\mu$m below the surface (FIG. 3(b)), but at a higher concentration. From 10 $\mu$m to 30 $\mu$m (FIG. 3(c)) the LSCM images were black, indicating the absence of accessible PMAA hydrogel regions. The existence of a black sub-surface layer can be attributed to the same monomer evaporation mechanism and to substrate-induced migration of monomer as discussed for IPNs prepared from Example 2.

It was expected that at the air-IPN interface a surface layer of PDMS would exist due its low surface energy, however the large increase in hydrogel at 5 $\mu$m was unexpected. The enclosed nitrogen environment in which the polymerization and crosslinking of the IPN took place was most likely saturated with monomer vapour from the pre-IPN film and this may have affected the final hydrogel composition of the surface layer. A mass balance calculation based on the vapour pressure of MAA at room temperature and the composition of gel at the air-IPN surface supports this explanation. Proceeding inward from the black layer, the morphology at 40 $\mu$m (FIG. 3(d)) changed to large spheres of PDMS-rich domains surrounded by PMAA-rich boundaries to give a honeycomb-like appearance. A similar morphology was seen at 50 $\mu$m (FIG. 3(e)); however, the PMAA-rich boundaries appeared to be more diffuse, and within each honeycomb, small, nodular PMAA-rich domains were visible. At 60 $\mu$m (FIG. 3(f)) no evidence of spheres or honeycomb-like structures could be seen; the separate phases had a nodular shape typical of spinodal decomposition. This morphology continued up to 100 $\mu$m below the surface, at which point LSCM detection was no longer possible.

EXAMPLE 5

Once the PDMS-PMAA IPN films prepared from Examples 1, 2 and 3 were washed with distilled water and achieved a stable mass, the films were placed in citric acid-disodium hydrogen phosphate buffer solutions of pH 7, 6, 5, 4, 3, (I=0.01) with stirring. The films were immersed in the buffer solution and the mass was measured on a regular basis until the IPN films came to swelling equilibrium. It was found that the swollen mass of the IPN films changed as a function of pH. The mass was highest at pH 7 and decreased as the pH of the buffer solution decreased. Table two lists the hydration of a PDMS-PMAA film equilibrated at different pH conditions. Hydration is defined as the weight fraction of water contained in the swollen IPN film where H=(mass of water in IPN)/(mass of swollen IPN). The hydration of IPNs prepared from examples 1, 2 and 3 were indistinguishable, despite the fact that IPNs in examples 2 and 3 were not bicontinuous.

TABLE 2

| PH | Hydration of PDMS-PMAA IPN |
|---|---|
| 3 | 0.4 |
| 4 | 0.47 |
| 5 | 0.67 |
| 6 | 0.8 |
| 7 | 0.88 |

EXAMPLE 6

PDMS-PMAA IPN films prepared from Examples 1, 2 and 3 and swollen to equilibrium in pH 7 buffer solution were used as membranes and examined for their permeability to hydrophilic solutes. The solute used in this study was vitamin $B_{12}$ having a molecular weight of 1200 daltons. Permeation studies were carried out at 37° C. using standard two compartment diffusion cells. The donor chamber was filled with 15 mL of 1000 ppm vitamin $B_{12}$ solution which had been prepared using a pH 7 buffer solution. The receptor chamber was filled with 15 mL of the pH 7 buffer solution containing no permeate. The receptor chamber was sampled at specified time intervals. The volume removed was replaced with fresh buffer. Approximate infinite sink condition was maintained in all experiments. The sample solutions were monitored at 362 nm for vitamin $B_{12}$ using a Hewlett Packard 8450 UV-Vis Spectrophotometer.

Despite the high hydration, no permeation of vitamin $B_{12}$ through the PDMS-PMAA IPNs prepared from examples 2 and 3 could be detected over a one month permeation experiment. Based on the detection limits of the UV-Vis spectrophotometer, this corresponded to a value of permeability of less than $1.9 \times 10^{31-13}$ $cm^2/s$. In contrast, the permeability of $VB_{12}$ through the PDMS-PMAA IPN membrane prepared from example 1 was found to be $6.5 \times 10^{-8}$ $cm^2/s$ at pH 7. This difference in permeability was attributed to the lack of continuity of the hydrogel phase in the surface region of the IPN as was observed in the LSCM images (FIGS. 2 and 3) produced from the method in example 4.

EXAMPLE 7

The PDMS-PMAA IPN prepared from example 1 was used to carry out a dynamic permeation experiment, where mass transfer through the membrane was analyzed as the pH of the buffers solutions was varied. This was carried out to see if permeation could be made to vary as a function of pH, as well as to demonstrate that the permeability change brought on by different pH conditions was reversible.

Permeation studies were carried out as described in example six, with the following exceptions; permeation of vitamin $B_{12}$ through the PDMS-PMAA IPN membrane occurred at pH 7 buffer conditions for 48 h. At 48 h the buffer solution of both compartments was removed and replaced with a 1000 ppm vitamin $B_{12}$ solution prepared using a pH 3 buffer solution for the donor cell and a pH 3 buffer solution for the receptor cell. Permeation of the solute under these new conditions was monitored immediately after the change took place and for a time period of 4 h following the pH change. The buffer solutions in both compartments were then changed back to pH 7 conditions, placing 1000 ppm vitamin $B_{12}$ solution in the donor compartment and pH 7 buffer solution only in the receptor compartment. Samples were taken for approximately 24 h following the pH change.

Figure 4:
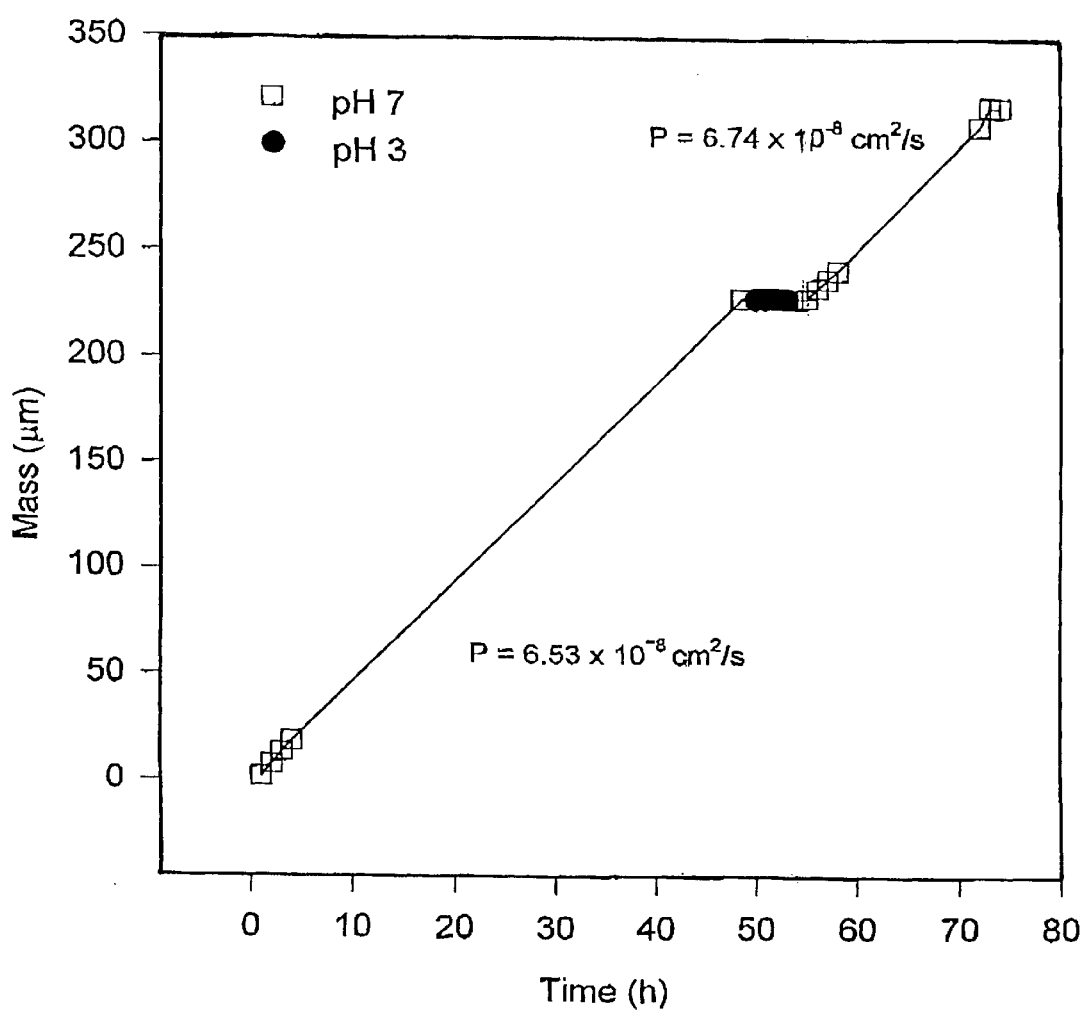
FIG. 4 is a graph showing the mass of vitamin $B_{12}$ permeating through the bicontinuous PDMS-PMAA IPNs prepared in Example 1 as a function of time and pH conditions. The permeability at each pH 7 calculated using the flux (slope of the line) is shown. The permeability at pH 3 for that 4 hour time period was zero.

It was found that as pH was changed back to 7, permeation quickly increased back to the same value as before the pH 3 buffer change (FIG. 4).

FIG. 4 is a graph of the amount of vitamin $B_{12}$ mass transferred through the membrane as a function of time and surrounding pH. At pH 7 the permeability of mass through the material is $6.53 \times 10^{-8}$ $cm^2/s$ and mass transfer is zero order. When the pH of the surrounding solution is changed to pH 3, the mass decreased to an undetectable amount within the four hour period at pH 3 conditions. The detection limit of UV spectrophotometer for vitamin $B_{12}$ at 362 nm was approximately 0.01 ppm. When the pH of the surrounding solution changes to 7 permeation through the material resumes to pre-pH 3 levels and zero order release was quickly re-established. This example illustrates that: 1. the material is permeable to vitamin $B_{12}$ at pH 7 and impermeable to vitamin $B_{12}$ at pH 3; 2. permeability is dependent upon the pH of the surrounding solution; 3. the material responds quickly to the change in pH of the surrounding solution; 4. the permeation response to pH is reversible.

The change in permeability at different pH conditions was attributed to changes in the hydration and domain size of the PMAA gel domains of the IPN material. At high hydrations (pH 7), the size of the PMAA gel is also larger, and both high hydration and large domain size contribute to the increase in permeability through the material. At low pH (pH 3) the hydration and the size of the gel domain decrease. Both of these factors contribute to the decrease in the permeability through the material at pH 3.

What is claimed is:

1. A method of making a sequential interpenetrating polymer network (IPN) of at least a first polymer and a second polymer from a first and second component wherein the first component is the first polymer or a polymerizable reactant selected from monomers or pre-polymers polymerizable to the first polymer and mixtures thereof, and the second component is a polymerizable reactant selected from monomers or pre-polymers polymerizable to the second polymer and mixtures thereof, the method comprising the steps of:

crosslinking the polymer of the first component or simultaneously crosslinking and polymerizing the polymerizable reactant or pre-polymer of the first component to form a polymer network;

forming a reaction mixture of at least the polymer network of the first component, the second component, an initiator or catalyst, and a crosslinker by absorbing the second component, the initiator or catalyst and a crosslinker into the polymer network of the first component, the reaction mixture having a surface;

bringing the surface of the reaction mixture in contact with a third component comprising at least each said polymerizable reactant of the second component at a chemical potential similar to the chemical potential of the same reactant in the reaction mixture, and wherein said third component is substantially free of crosslinker and initiator or catalyst;

effecting polymerization and crosslinking of polymerizable reactants of the reaction mixture while maintaining said surface in contact with said third component, and recovering the IPN so obtained.

2. The method according to claim 1, wherein said IPN is bicontinuous over the entire body of the IPN.

3. The method according to claim 1, wherein said first polymer is hydrophobic and said second polymer is hydrophilic.

4. The method according to claim 1, wherein said third component is in vapor gaseous form or is in the form of a liquid which is immiscible with said reaction mixture.

5. The method according to claim 3, wherein said first component comprises polydimethysiloxane and said second component comprises methacrylic acid.

6. The method according to claim 1, wherein said second component of the reaction mixture has a concentration profile that is non-uniform.

7. The method according to claim 6, wherein said sequential IPN is bicontinuous over at least a portion of the surface thereof.

8. A method of making a simultaneous interpenetrating polymer network (IPN) of at least a first polymer and a second polymer from a first and second component wherein the first component is the first polymer, or a polymerizable reactant selected from monomers or pre-polymers polymerizable to the first polymer and mixtures thereof, and the second component is a polymerizable reactant selected from monomers or pre-polymers polymerizable to the second polymer, and mixture thereof, the method comprising the steps of:

forming a reaction mixture of at least the first component, the second component, an initiator or catalyst and a crosslinker by mixing;

providing means for suspending the reaction mixture in a third; component, wherein said third component comprises each polymerizable reactant of the first and second component at a chemical potential similar to the chemical potential of the same reactant in the reaction mixture and wherein said third component is substantially free of crosslinker and initiator or catalyst; effecting polymerization and crosslinking of polymerizable reactants of the reaction mixture while maintaining said surface in contact with said third component, and recovering the IPN so obtained.

9. A method according to claim 8, wherein said means for suspending is said first polymer.

10. An IPN of at least one hydrophobic polymer and at least one hydrophilic polymer, wherein the IPN is bicontinuous throughout the surface and body of the IPN.

11. An IPN of at least one hydrophobic polymer and at least one hydrophilic polymer which is bicontinuous over at least one external surface region, but not the entire body of the IPN.

12. An IPN as set forth in claim 10 having at least two said hydrophilic polymers, wherein the IPN is bicontinuous throughout the surface and body of the IPN, and is stimuli-responsive solely at an external surface of the IPN.

13. An IPN according to claim 10, 11 or 12, wherein the hydrophobic polymer is polydimethysiloxane and the hydrophilic polymer is poly(methacrylic acid).

14. An IPN according to claim 10, 11 or 12 wherein diffusion of hydrophilic and/or hydrophobic substances can occur through at least one external surface of said IPN.

15. An IPN according to claim 10, 11 or 12, which is stimuli responsive.

16. An IPN according to claim 10, 11 or 12, which is pH responsive.

17. A stimuli responsive membrane or matrix made from an IPN according to claim 10, 11 or 12.

18. A product selected from the group consisting of a contact lens, an intraocular lens, a blood contacting material, a wound dressing, catheters and drug delivery systems made from made from an IPN according to claim 10, 11 or 12.

19. The method according to claim 2, wherein said second component of the reaction mixture has a concentration profile that is uniform.

20. The method according to claim 1, wherein said third component has a similar surface tension to that of said reaction mixture.

* * * * *